United States Patent [19]
Kolb

[11] 3,883,113

[45] May 13, 1975

[54] FLUID CONTROL BALL VALVE STRUCTURE FOR THROTTLING SERVICE

[75] Inventor: John P. Kolb, Stafford, Tex.

[73] Assignee: ACF Industries, Incorporated, New York, N.Y.

[22] Filed: Mar. 29, 1974

[21] Appl. No.: 456,084

[52] U.S. Cl. ............... 251/209; 251/151; 251/315; 251/317
[51] Int. Cl. .............................................. F16k 5/06
[58] Field of Search ........... 251/304, 208, 124, 122, 251/123, 209, 315, 151, 317, 328; 137/625.3

[56] References Cited
UNITED STATES PATENTS

| | | | |
|---|---|---|---|
| 2,510,514 | 6/1950 | Mueller | 251/209 |
| 3,403,887 | 10/1968 | Myers | 251/209 |
| 3,542,337 | 11/1970 | Scaramucci | 251/209 |
| 3,542,338 | 11/1970 | Scaramucci | 251/209 |
| 3,762,682 | 10/1973 | Franck | 251/124 |
| 3,773,291 | 11/1973 | Graver | 251/209 X |

FOREIGN PATENTS OR APPLICATIONS

| | | | |
|---|---|---|---|
| 1,076,448 | 4/1953 | France | 251/207 |
| 791,131 | 9/1934 | France | 251/207 |
| 1,006,998 | 12/1949 | France | 251/209 |

*Primary Examiner*—Martin P. Schwadron
*Assistant Examiner*—Robert J. Miller
*Attorney, Agent, or Firm*—Eugene N. Riddle

[57] ABSTRACT

A ball valve structure having a ball member with upstream and downstream circular edge portions defining the entrance and exit ports of the ball member which ports are positioned adjacent the upstream and downstream seat members. Each of the circular edge portions has a generally arcuate groove or indentation therein positioned on the circumferential segment of the respective circular edge portion initially clearing the adjacent associated seat member upon rotation of the ball member from a fully closed position thereby increasing substantially the flow area exposed to fluid flow upon the initial opening of the valve member.

5 Claims, 7 Drawing Figures

FLUID CONTROL BALL VALVE STRUCTURE FOR THROTTLING SERVICE

BACKGROUND OF THE INVENTION

The present invention is directed primarily toward ball valves which are employed in throttling service with the ball member being positioned in a partially opened position. Especially when ball valves are used in throttling service with slurry-type ladings in which solid particles are suspended, wear and erosion of the ball member and adjacent seat members occur particularly in the flow areas defined by the circumferential edge portions of the ball member and adjacent seats which are exposed to the fluid flow. The erosion and wear on both downstream and upstream seat members resulting from slurries and the like when the ball valve is in throttling service oftentimes causes leakage from the fully closed position especially after prolonged periods of use in such throttling service. In plug type valves having cyindrical or tapered plugs which are rotated between open and closed positions, notches have been provided adjacent the plug opening heretofore to vary the flow area at various throttling positions.

DESCRIPTION OF THE PRESENT INVENTION

The present invention comprises a ball valve structure having a bore therethrough with entrance and exit ports on opposed ends of the bore and providing immediately upon opening of the ball member a relatively large flow area. The large flow area provided upon initial opening of the valve ball is effected by having an arcuate indentation or groove on the circumferential edge portion of the valve ball defining the entrance port and positioned on the leading circumferential segment of the edge portion initially clearing the upstream seat member upon rotation of the ball member from closed position toward open position. The arcuate indentation or groove upon being exposed initially to fluid flow provides a relatively large flow area upon the initial opening of the valve ball. To permit exit of the fluid initially received through the flow area defined by the indentation or groove on the upstream edge portion, the leading circumferential segment of the downstream edge portion defining the exit port clears the downstream seat slightly before the arcuate groove on the upstream circumferential edge portion clears the upstream seat upon initial opening of the valve ball from closed position so that a fluid through the bore is provided immediately upon the initial opening of the valve ball. The flow rate with the present invention employing the arcuate groove or indentation is increased over that of a conventional ball valve member having no groove or indentation until around 45° of rotation from fully closed position. The flow area between around 15° and 30° opening from the fully closed transverse position of the valve ball for the present invention is over twice the size of the flow area for a conventional ball valve structure.

In the accompanying drawings in which one of various possible embodiments of the invention is illustrated, FIG. 1 is a longitudinal sectional view of the valve structure forming the present invention;

Figure 1:
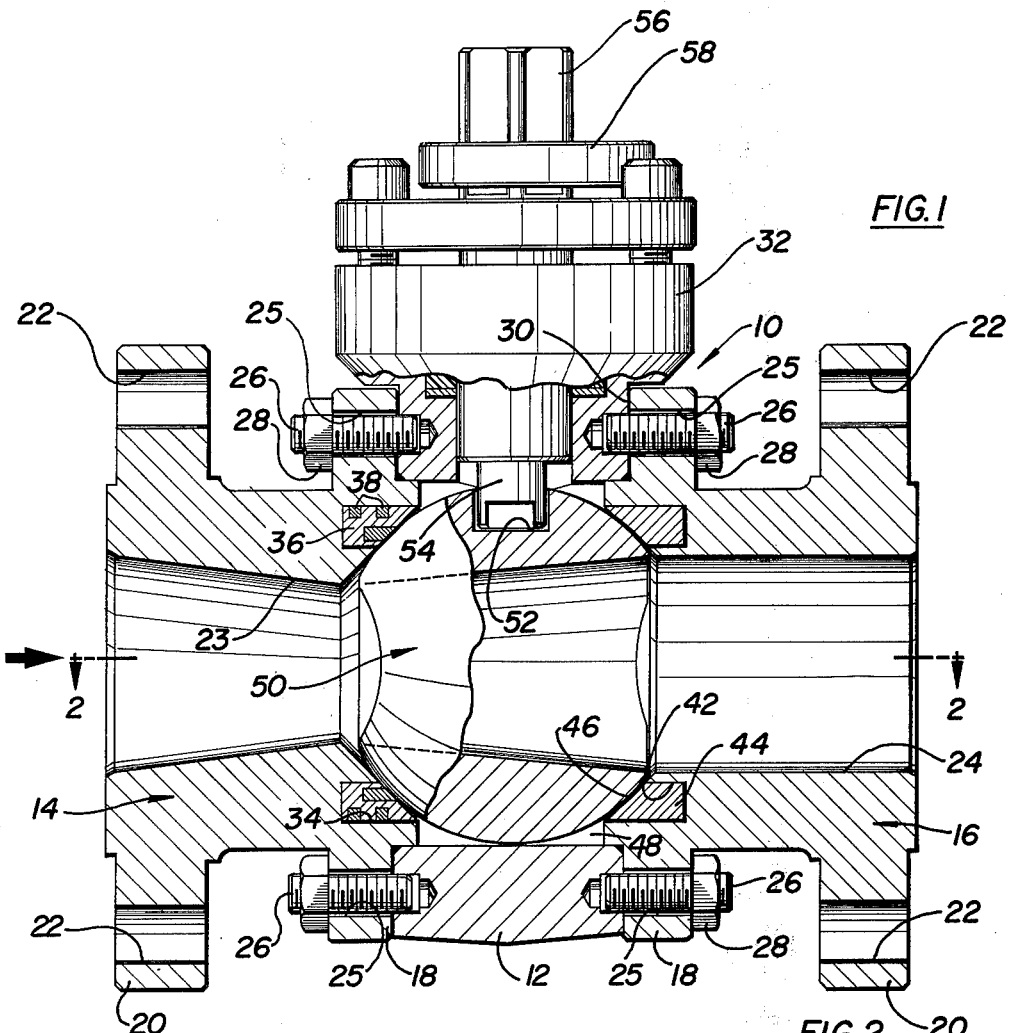
Figure 2:
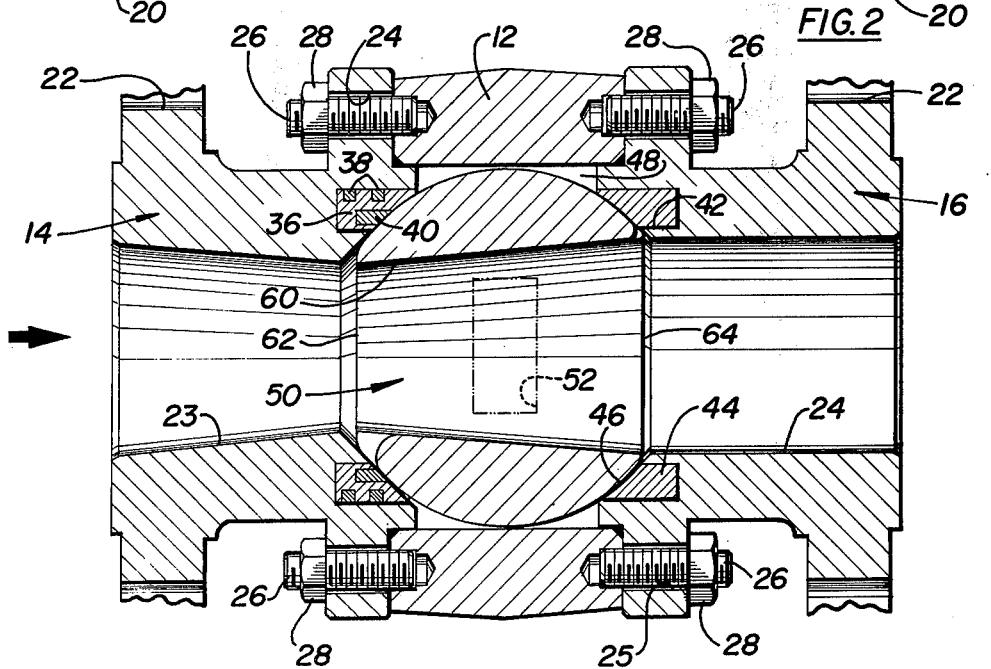
FIG. 2 is a longitudinal sectional view taken generally along line 2—2 of FIG. 1.
Figure 4:
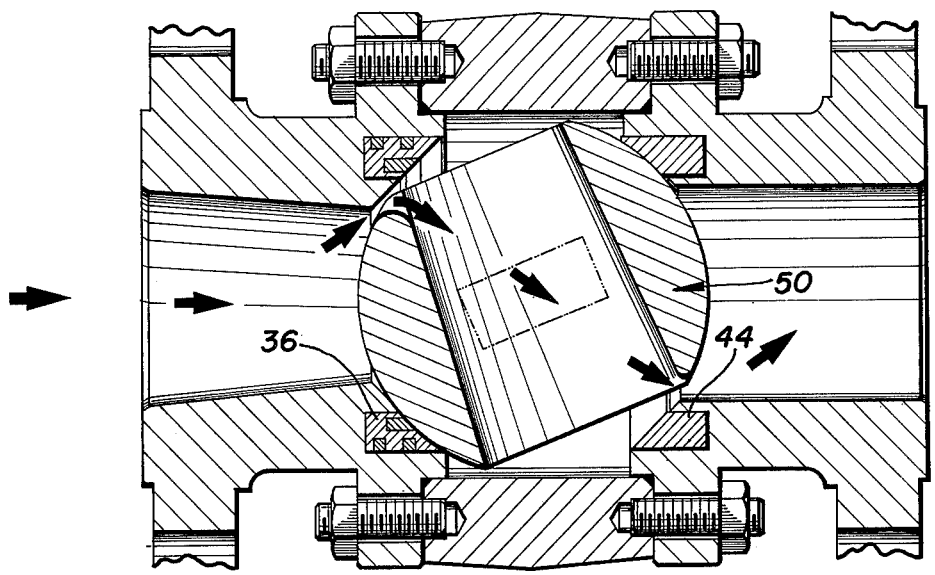
FIG. 4 is a sectional view similar to FIG. 3 but showing the valve ball member rotated around 15° from its fully closed position.

Referring now to the drawings for a better understanding of this invention, the ball valve structure comprising the present invention is indicated generally at 10 and includes a body portion 12, an inlet end portion generally designated 14, and an outlet end portion generally designated 16. End portions 14 and 16 have inner flanges 18 and outer flanges 20. Openings 22 in outer flanges 20 may be employed to receive suitable bolt and nut combinations (not shown) for connection to facing flanges on adjacent conduits, such as pipelines or the like (not shown). End portion 14 provides a tapered inlet flow passage 23 and end portion 16 provides an outlet flow passage 24. Inner flanges 18 have openings 25 therein which receive studs 26 and nuts 28 threaded onto studs 26 for connecting end portions 14 and 16 to body portion 12.

A central recess 30 is provided within end portions 14 and 16 and body portion 12 to receive a bonnet generally indicated 32 therein. Studs 26 and nuts 28 also secure bonnet 32 within recess 30. Inlet end portion 14 has annular recess 34 which receives an annular upstream seat member 36 therein. Seat member 36 maybe formed of a metallic material and has a pair of metal rings 38 fitting within circumferential recesses therein. Sealing member 40 is received in a recess of seat 36 and is preferably formed of Teflon. Outlet end portion 16 has an annular groove 42 therein which receives an annular downstream seat member 44. Seat member 44 may, if desired, be formed of a carbon steel material with a stellite overlay on its working face 46.

A valve chamber 48 is formed between end portions 14 and 16 and receives valve ball member generally indicated 50 therein. A recess 52 within the upper portion of valve ball member 50 receives a valve stem 54 therein. The upper end 56 of valve stem 54 may receive a handle or the like (not shown) for rotation of valve ball member 50 between open and closed positions. An indicator 58 on valve stem 54 indicates the position of valve ball member 50. Stem 54 is received within bonnet 32 with suitable packing therebetween.

Valve ball 50 has a tapered bore 60 of a circular cross section and forming an inlet or entrance part 62 and an exit port 64. Inlet port 62 is defined by an upstream circumferential edge portion of valve ball 50 and exit port 64 is defined by a downstream edge portion of valve ball 50. Bore 60 increases progressively in diameter from inlet port 62 to exit port 64.

Figure 5:
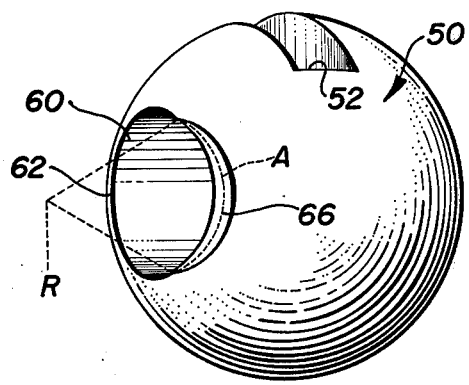
FIG. 5 is a perspective view of the valve ball shown removed from the valve chamber an illustrating the arcuate indentation adjacent the entrance port of the valve ball.

As shown particularly in FIG. 5, upstream circumferential edge portion forming entrance port 62 has an arcuate indentation or notch 66 therein positioned on the leading circumferential segment of the upstream edge portion which initially clears upstream seat member 36 upon rotation of ball member 50 from a fully closed position to an open position. Indentation 66 is arcuate and increases substantially the flow area upon the initial opening of valve ball member 50 from closed position. Notch or indentation 66 is in a remote segment of the upstream circumferential edge portion with respect to a plane which passes through the axis of rotation and the longitudinal centerline of valve bore 60. The center of arc A defined by notch 66 is positioned at right angles to the plane passing through the axis of rotation and the longitudinal centerline of bore 60. The length of arc A which is struck from a radius indicated at R on FIG. 5 depends on the diameter of bore 60 and the increased flow area desired upon initial opening of valve ball member 50. For example, with ball valve member 50 having an entrance port 62 of 2 inches in diameter, optimum results may be obtained with arc A being around 120° of the total circumference of the upstream circumferential edge portion. Satisfactory results may be obtained with arc A including as low as 30° of the upstream circumferential edge portion and as high as 180° of the upstream edge portion.

Figure 6:
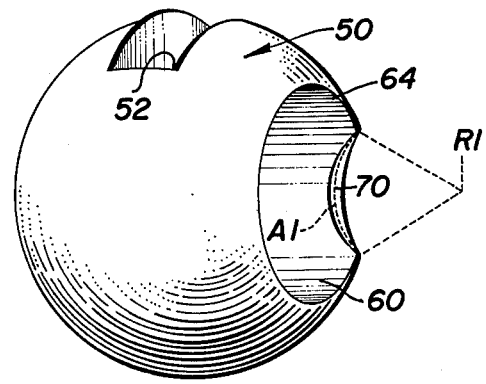
FIG. 6 is a perspective view of the valve ball member shown removed from the valve chamber and illustrating the arcuate indentation adjacent the exit port of the valve ball member.

Referring to FIG. 6, the groove or indentation 70 for the downstream edge portion is illustrated. Valve bore 60 increases in diameter from entrance port 62 to exit port 64 and for example may have an entrance port 62 of 2 inches in diameter and an exit port 64 of 3 inches in diameter. The percentage of the downstream circumferential edge portion defined by arc A1 swung from a radius R1 as shown in FIG. 6 will usually be smaller than the percentage of the total upstream circumferential edge portion for indentation 60 on entrance port 62. Groove 70 is positioned so that it is exposed to the downstream flow passage 24 slightly before indentation 66 on the upstream edge portion is exposed to upstream flow passage 23 so that a continuous fluid flow in insured through bore 60 upon initial opening of ball valve member 50.

Figure 3:
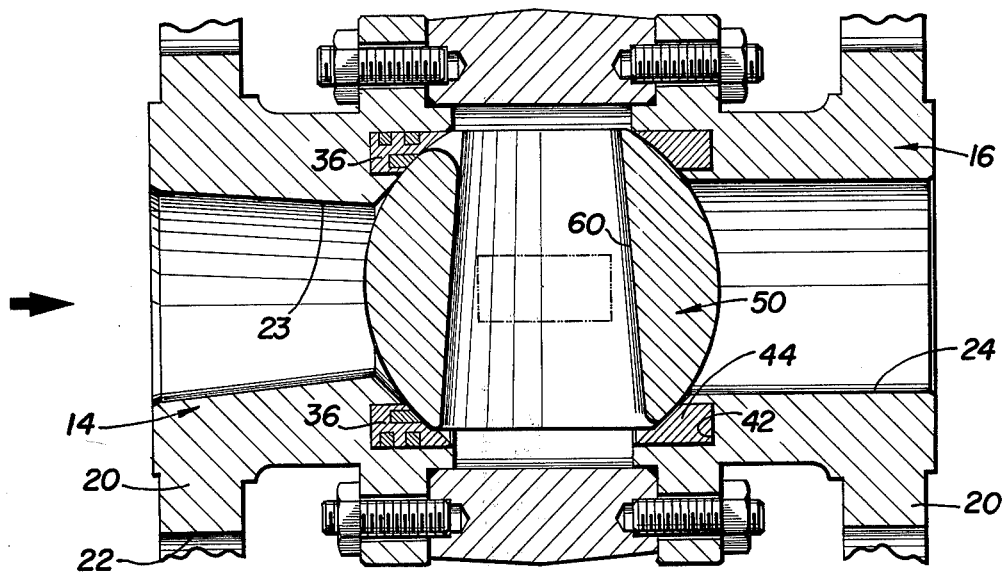
FIG. 3 is a longitudinal sectional view similar to FIG. 2 but showing the valve ball member in a closed position.
Figure 7:
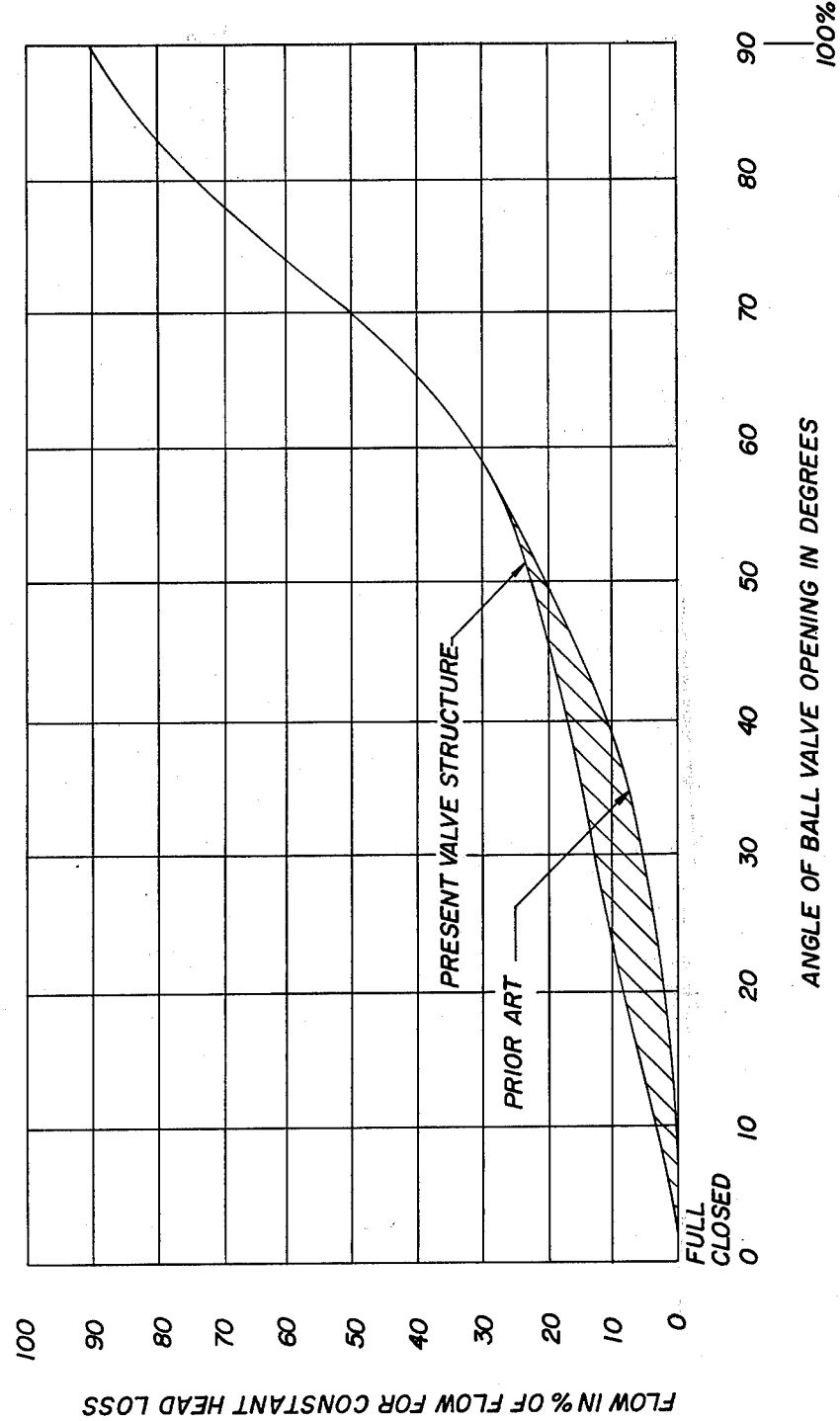

As shown in FIG. 7, increased flow area for ball valve member 50 comprising the present invention is illustrated in comparison with a conventional ball valve in which no notches or indentations are provided in the circumferential edge portions defining entrance and exit ports. An increased flow area is provided after around 5% of rotation of the valve ball member 50 from its fully closed position and the increased flow area continues until ball valve member 50 reaches around 55° of rotation. In operation, referring to FIG. 3 in which the valve ball is shown in a closed position, rotation of valve ball member 50 permits indentation 70 to clear downstream seat 44 slightly before indentation 66 clears upstream seat 36. Thus, as soon as groove 66 clears seat 36 fluid flow from upstream flow passage 23 may flow through bore 60 and be exposed to downstream flow passage 24 through indentation 70. The ball valve structure comprising the present invention is particularly adapted for throttling service from the initial opening of a valve ball member 50 up to around 55° of rotation. By having grooves 66 and 70 formed in the opposed leading edges with respect to the direction of rotation from closed position, an arcuate smooth edge portion is exposed initially to fluid flow which reduces wear and erosion to a minimum. The upstream and downstream seat members 36 and 44 are formed of metal such as carbon steel to provide a high resistance to wear.

While the valve illustrated in the drawings shows valve ball member 50 having a tapered bore, it is to be understood that the present invention may be employed with a valve ball member having a bore of a constant diameter, if desired. The tapered bore design as shown herein provides in throttling service a reduction in noise by the control of turbulence and the minimizing of resonance harmonics.

What is claimed is:

1. A fluid control ball valve structure comprising a valve body having a valve chamber, upstream and downstream flow passages formed in said valve body and being in fluid communication with the valve chamber, a ball member disposed within the valve chamber and having a bore therethrough, means to rotate the ball member about a fixed axis of rotation between an open position in which the bore is in axial alignment with the flow passages and a closed position in which the bore is positioned generally at a right angle to the flow passages, an annular upstream seat member about the upstream flow passage and an annular downstream seat member about the downstream flow passage, the bore through said ball member having an entrance port adjacent the upstream seat member and an exit port adjacent the downstream seat member, and a circumferential upstream edge portion on said ball member defining the entrance port and having a generally arcuate indentation therein positioned on the circumferential segment of the edge portion initially clearing the upstream seat member upon rotation of the ball member from fully closed position toward open position, said arcuate indentation being struck from a generally constant radius which is positioned generally along a horizontal plane extending through the centerline of the flow passage with the surface formed by the indentation being beveled along its lateral edges, said indentation upon being exposed initially to fluid flow increasing substantially the flow area upon the initial opening of the valve member.

2. A fluid control ball valve structure as set forth in claim 1 wherein said bore increases progressively in diameter from the entrance port to the exit port.

3. A fluid control ball valve structure as set forth in claim 1 wherein a downstream circumferential edge portion defines the exit port of said bore and has an arcuate indentation positioned on a segment thereof initially clearing the downstream seat member upon rotation of the ball member from fully closed position toward open position thereby to permit exit of the fluid initially received through the flow area defined by said arcuate indentation on the upstream edge portion.

4. A fluid control ball valve structure as set forth in claim 1 wherein said arcuate indentation extends for at least thirty degrees of the circumference of said edge portion to a maximum of one hundred and eighty degrees.

5. A fluid control ball valve structure comprising a valve body having a valve chamber, upstream and downstream flow passages formed in said valve body and being in fluid communication with the valve chamber, a valve ball member disposed within the valve chamber and having a bore therethrough, means to rotate the ball member about a fixed axis of rotation between an open position in which the bore is in axial alignment with said flow passages and a closed position in which the bore is positioned generally at a right angle to the flow passages, an annular upstream seat member about the upstream flow passages and an annular downstream seat member about the downstream flow passage, the bore through said ball member having an entrance port adjacent the upstream seat member and an exit port adjacent the downstream seat member, and opposed circular circumferential edge portions of said ball member defining the entrance and exit ports and each edge portion having a generally arcuate groove therein for at least thirty degress of its circumference positioned on the circumferential segment of the respective edge portion initially clearing the adjacent seat member upon rotation of the ball member from fully closed position toward an open position, said arcuate grooves being struck from generally constant radii positioned generally along a horizontal plane extending through the centerline of the flow passage with the surfaces formed by the grooves being beveled along their lateral edges, said grooves upon being exposed initially to fluid flow increasing substantially the flow area upon the initial opening of the valve ball member.

* * * * *